US008681090B2

(12) United States Patent
Miyashita

(10) Patent No.: US 8,681,090 B2
(45) Date of Patent: Mar. 25, 2014

(54) ELECTROPHORETIC DISPLAY PANEL

(75) Inventor: Takashi Miyashita, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 659 days.

(21) Appl. No.: 12/841,337

(22) Filed: Jul. 22, 2010

(65) Prior Publication Data

US 2011/0057870 A1   Mar. 10, 2011

(30) Foreign Application Priority Data

Sep. 7, 2009   (JP) ................................. 2009-206289

(51) Int. Cl.
*G09G 3/34*   (2006.01)
(52) U.S. Cl.
USPC ........................................................ 345/107
(58) Field of Classification Search
USPC ........................................................ 345/107
See application file for complete search history.

(56) References Cited

U.S. PATENT DOCUMENTS

| | | | | |
|---|---|---|---|---|
| 7,075,502 | B1 * | 7/2006 | Drzaic et al. ..................... | 345/55 |
| 2003/0117016 | A1 * | 6/2003 | Ukigaya ........................ | 305/107 |
| 2003/0160247 | A1 * | 8/2003 | Miyazawa ....................... | 257/79 |
| 2006/0125779 | A1 * | 6/2006 | Liang et al. .................... | 345/107 |
| 2007/0268245 | A1 * | 11/2007 | Sugita et al. ................... | 345/107 |
| 2008/0048970 | A1 * | 2/2008 | Drzaic et al. ................... | 345/107 |
| 2009/0268274 | A1 * | 10/2009 | Masuzawa et al. ........... | 359/296 |

FOREIGN PATENT DOCUMENTS

| | | |
|---|---|---|
| JP | 2005-031345 A | 2/2005 |
| JP | 2007-256495 A | 10/2007 |
| JP | 2009-9092 A | 1/2009 |
| JP | 2009-192637 A | 8/2009 |
| WO | WO2008146950 A1 * 12/2008 | ............. G02F 1/167 |

OTHER PUBLICATIONS

Japanese Office Action dated Oct. 18, 2011 (and English translation thereof) in counterpart Japanese Application No. 2009-206289.

* cited by examiner

*Primary Examiner* — Alexander S Beck
*Assistant Examiner* — Mihir Rayan
(74) *Attorney, Agent, or Firm* — Holtz, Holtz, Goodman & Chick, PC

(57) ABSTRACT

An electrophoretic display panel includes a first substrate, a second substrate, a partition wall, first electrodes, a second electrode, a dispersant, positively-charged particles, negatively-charged particles, weakly-charged particles, switching thin film transistors, scanning lines, and signal lines. Pixel spaces are surrounded by the partition wall, the first substrate and the second substrate. Two of the first electrodes are formed on the first substrate in each pixel. The second electrode facing the first electrodes is formed on the second substrate. The dispersant with the positively-charged particles, the negatively-charged particles, and weakly-charged particles is contained in the pixel spaces. The switching thin film transistors are connected to the first electrode, and the signal line. The scanning lines supply scanning signals to gate electrodes of the switching thin film transistors. The signal lines input a data signal to the switching thin film transistors.

8 Claims, 8 Drawing Sheets

ELECTROPHORETIC DISPLAY PANEL

CROSS-REFERENCE TO RELATED APPLICATIONS

This application is based upon and claims the benefit of priority from the prior Japanese Patent Application No. 2009-206289, filed. Sep. 7, 2009, the entire contents of which are incorporated herein by reference.

BACKGROUND OF THE INVENTION

1. Field of the Invention

The present invention relates to an electrophoretic display panel.

2. Description of the Related Art

An electrophoretic display device is beginning to find application in such fields as electronic book readers, cellular phones, electronic shelf labels, and watches. The electrophoretic display device is capable of display easy on eyes because it can obtain a reflectivity, contrast, and angle of view close to those of paper. Since the electrophoretic display device has a memory property, the device consumes power only for display rewrite, and requires no more power once data is displayed. That is, the electrophoretic display device is a low power consumption display device. The electrophoretic display device also has a structure simpler than that of a liquid crystal display device or an organic electroluminescent display device. Hence, the display device is expected to be more flexible.

As an electrophoretic display device having such characteristic features, an electrophoretic display device capable of displaying three colors in one pixel is disclosed in, for example, Jpn. Pat. Appln. KOKAI Publication No. 2009-9092. The electrophoretic display device disclosed in Jpn. Pat, Appln. KOKAI Publication No. 2009-9092 has an electrophoretic cell. The electrophoretic cell has, per pixel, two electrodes on one substrate and one electrode on the counter substrate. An electrophoretic solution is sealed in the electrophoretic cell. The electrophoretic solution is a dispersant containing three kinds of particles having different optical and electrical characteristics, i.e., first particles having positive charges, second particles having negative charges, and third particles having no charges. This structure allows the electrophoretic display device to display three colors in one pixel.

Since the electrophoretic display device has two electrodes per pixel on one substrate, the number of interconnection lines on the one substrate is twice as many as the total number of pixels. For this reason, when a high-resolution electrophoretic display panel including a lot of pixels is needed, it is difficult to arrange the electrodes and the interconnection lines.

BRIEF SUMMARY OF THE INVENTION

According to an aspect of the invention, an electrophoretic display panel includes a first substrate; a second substrate which faces the first substrate with a predetermined interval; at least one partition wall configured to form a boundary of a plurality of pixel spaces, the pixel spaces being surrounded by the partition wall, the first substrate and the second substrate; a plurality of first electrodes formed on the first substrate, each of the pixel spaces including two first electrodes; at least one second electrode formed on the second substrate, the second electrode facing the first, electrodes; a dispersant contained in each of the pixel spaces; positively-charged particles suspended in the dispersant and contained in each of the pixel spaces; negatively-charged particles suspended in the dispersant and contained in each of the pixel spaces; weakly-charged particles suspended in the dispersant and contained in each of the pixel spaces, the weakly-charged particles having charges whose absolute value is smaller than absolute values of charges of the positively-charged particles and the negatively-charged particles; a plurality of switching thin film transistors each including a source electrode, a drain electrode and a gate electrode; scanning lines configured to supply, to the gate electrodes of the switching thin film transistors, scanning signals for selectively turning the switching thin film transistors to ON states; and signal lines each connected to one of the source electrode and the drain electrode of each of the corresponding switching thin film transistors, the other of the source electrode and the drain electrode being connected to a corresponding one of the first electrodes, and configured to input a data signal to the switching thin film transistors in the ON state so as to cause the positively-charged particles, the negatively-charged particles, and the weakly-charged particles to migrate, wherein adjacent and opposite sides of the two first electrodes included in each of the pixel spaces are curved in an S-shape and are parallel to each other with a predetermined interval therebetween.

According to another aspect of the invention, an electrophoretic display panel includes a first substrate; a second substrate which faces the first substrate with a predetermined interval; at least one partition wall configured to form a boundary of a plurality of pixel spaces, the pixel spaces being surrounded by the partition wall, the first substrate and the second substrate; a plurality of first electrodes formed on the first substrate, each of the pixel spaces including two first electrodes; at least one second electrode formed on the second substrate, the second electrode facing the first electrodes; dispersant contained in each of the pixel spaces; positively-charged particles suspended in the dispersant and contained in each of the pixel spaces; negatively-charged particles suspended in the dispersant and contained in each of the pixel spaces; weakly-charged particles suspended in the dispersant and contained in each of the pixel spaces, the weakly-charged particles having charges whose absolute value is smaller than absolute values of charges of the positively-charged particles and the negatively-charged particles; a plurality of first switching thin film transistors each including a source electrode, a drain electrode and a gate electrode, each of the source electrodes of the first switching thin film transistors being connected to one of the first electrodes included in each pixel spaces; a plurality of second switching thin film transistors each including a source electrode, a drain electrode and a gate electrode, each of the source electrodes of the second switching thin film transistors being connected to the other of the first electrodes included in each pixel spaces; scanning lines configured to commonly supply, to the gate electrodes of the first switching thin film transistors and the second switching thin film transistors, scanning signals for selectively turning on the first switching thin film transistors and the second switching thin film transistors; first signal lines each connected to the drain electrode of each of the corresponding first switching thin film transistors to input a data signal to the first switching thin film transistors so as to cause the positively-charged particles, the negatively-charged particles, and the weakly-charged particles to migrate; and second signal lines each connected to the drain electrode of each of the corresponding second switching thin film transistors to input a data signal to the second switching thin film transistors so as to cause the positively-charged particles, the negatively-charged particles, and the weakly-charged particles to migrate, wherein adjacent and opposite sides of the two first electrodes included in each of the pixel spaces are curved in an S-shape and are parallel to each other with a predetermined interval therebetween.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments the invention, and together with the general description given above and the detailed description of the embodiments given below, serve to explain the principles of the invention.

DETAILED DESCRIPTION OF THE INVENTION

The best mode for carrying out the present invention will now be described with reference to the accompanying drawings. Various limitations technically preferable for practicing the present invention are given to the embodiments to be described below. However, the scope of the invention is not limited to the embodiments and illustrated examples.

First Embodiment

Figure 1:
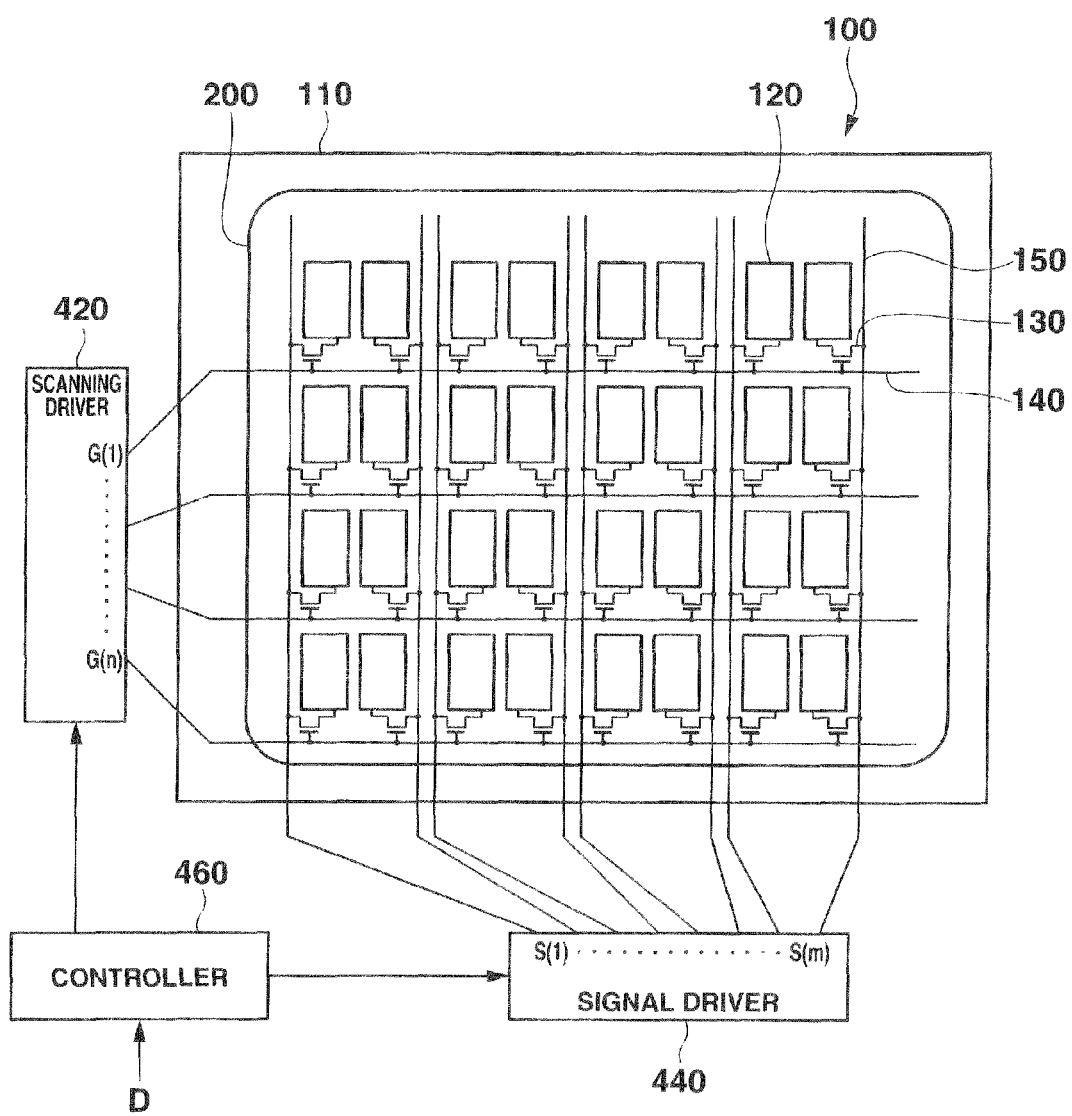
FIG. 1 is a schematic view showing an example of the arrangement of a display apparatus including an electrophoretic display panel according to each embodiment of the present invention.

The first embodiment of the present invention will be described first with reference to the accompanying figures. FIG. 1 is a view showing the arrangement of a display apparatus including an electrophoretic display panel according to the embodiment. As shown in FIG. 1, the electrophoretic display apparatus includes a display panel 100, a scanning driver 420, a signal driver 440, and a controller 460. The display panel 100 displays an image based on image data D supplied out of the electrophoretic display apparatus. The display panel 100 includes a display device having an electrophoretic layer sandwiched between a pixel-side substrate 110 and a COM substrate 200.

A plurality scanning lines 140 (G(j) (j=1, 2, . . . , n)) and a plurality of signal lines 150 (S(i) (i=1, 2, . . . , m)) run so as to intersect each other on the pixel-side substrate 110. A pixel electrode 120 is arranged at each of positions corresponding to the intersections between the scanning lines 140 and the signal lines 150. The pixel electrodes 120 are electrically connected to the scanning lines 140 (G(j)) and the signal lines 150 (S(i)) via thin-film transistors (TFTs) 130. Hence, m pixel electrodes 120 are connected to each scanning line, whereas n pixel electrodes 120 are connected to each signal line. FIG. 1 schematically illustrates the display panel 100 in which n=4, and m=8, for the sake of simplicity.

Figure 2:
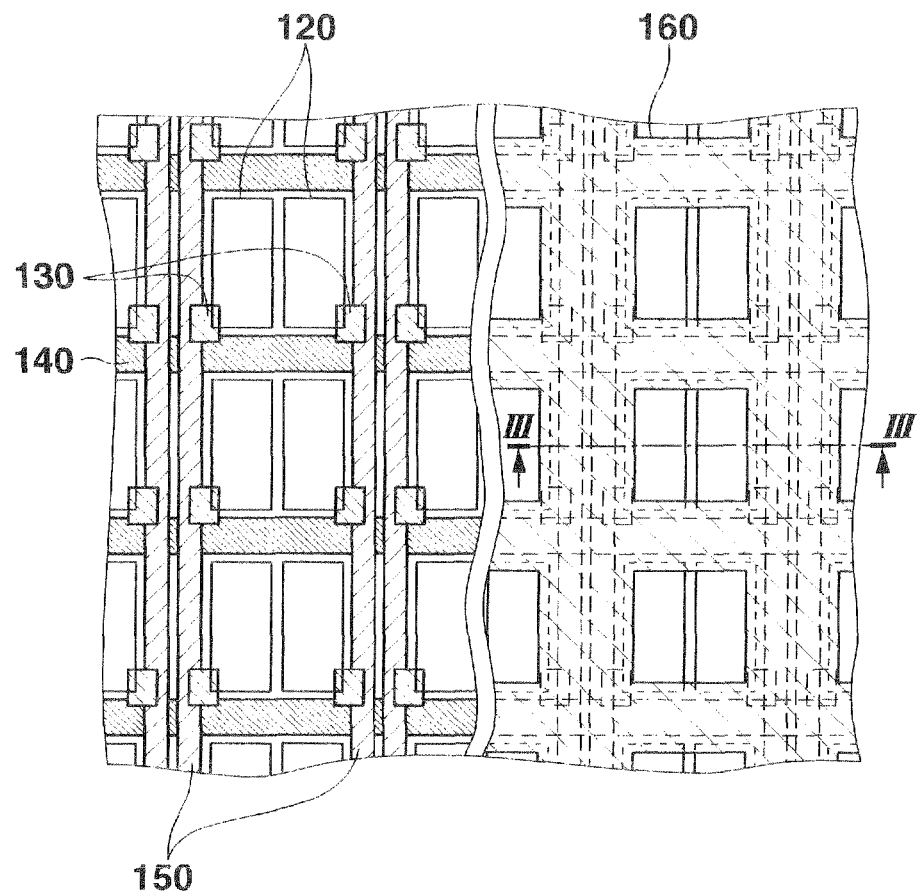
FIG. 2 is a schematic planar view showing an example of the structure of an electrophoretic display panel according to the first embodiment of the present invention.
Figure 3:
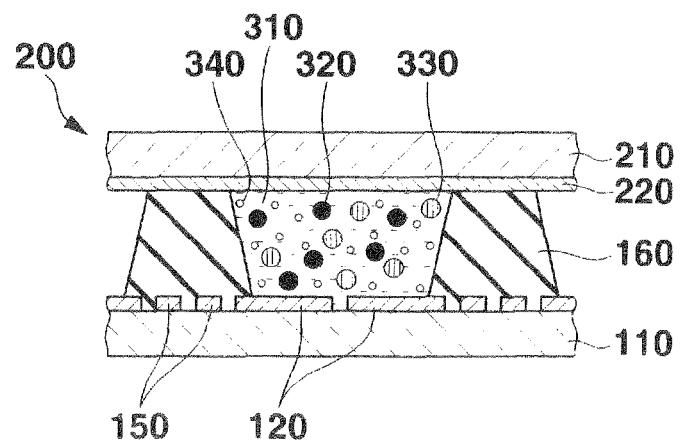
FIG. 3 is a schematic sectional view showing an example of the structure of the electrophoretic display panel according to the first embodiment of the present invention.

An example of the structure of the display panel 100 according to this embodiment will further be described with reference to FIGS. 2 and 3. FIG. 2 is a planar view, and FIG. 3 is a sectional view. In the electrophoretic display panel according to the embodiment, two pixel electrodes 120 are formed per one pixel on the pixel-side substrate 110, as shown in FIGS. 2 and 3. The pixel-side substrate 110 may, for example, be a glass substrate. The pixel electrodes 120 may be formed from, for example, indium tin oxide (ITO) layers. The pixel electrodes 120 are electrically connected to the source electrodes of the TFTs 130 each serving as a switching element. The scanning lines 140 are electrically connected to gate electrodes of the TFTs 130. The signal lines 150 are electrically connected to drain electrodes of the TFTs 130. The scanning lines 140 and the signal lines 150 intersect each other at right angles, as described above. Although not illustrated in FIGS. 2 and 3, compensatory capacity electrodes are formed between the pixel-side substrate 110 and the pixel electrodes 120. Each compensatory capacity electrode is electrically connected to a compensatory capacity line. Microribs 160 are formed on the scanning lines 140, the signal lines 150, the compensatory capacity lines, the TFTs 130, and parts of the pixel electrodes 120 so as to surround each pair of the pixel electrodes 120 forming one pixel, the upper surfaces of the pixel electrodes 120 being exposed.

The COM substrate 200 is placed on the upper surfaces of the microribs 160. The COM substrate 200 is prepared by forming a common electrode 220 made of a transparent conductive layer such as an ITO layer on a transparent substrate 210 such as a transparent glass substrate. Positively-charged black particles 320, negatively-charged red particles 330, and neutral white particles 340 suspended in a dispersant 310 are contained in each pixel compartment surrounded by the pixel-side substrate 110, the COM substrate 200, and the microribs 160, as shown in FIG. 3.

Figure 4:
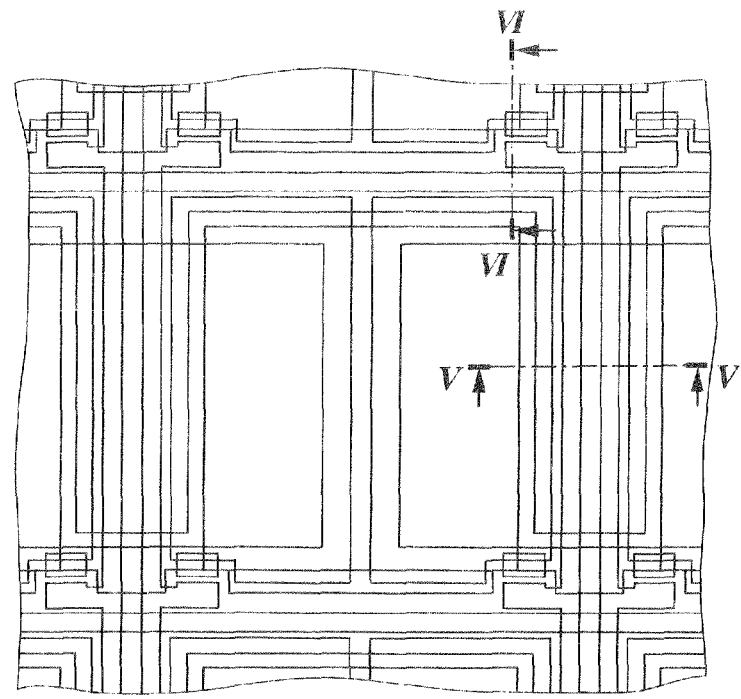
FIG. 4 is a planar view showing details of an example of the structure of an electrophoretic display device according to the first embodiment of the present invention.
Figure 5:
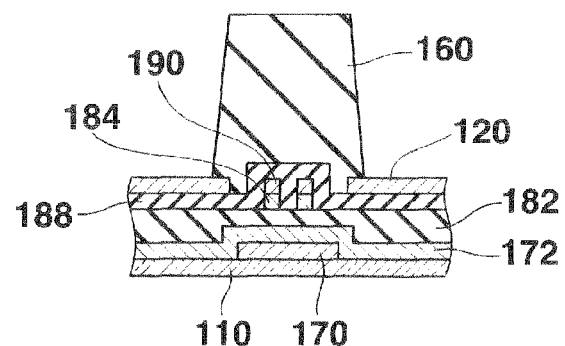
FIG. 5 is a sectional view showing details of an example of the structure of the electrophoretic display device according to the first embodiment of the present invention.
Figure 6:
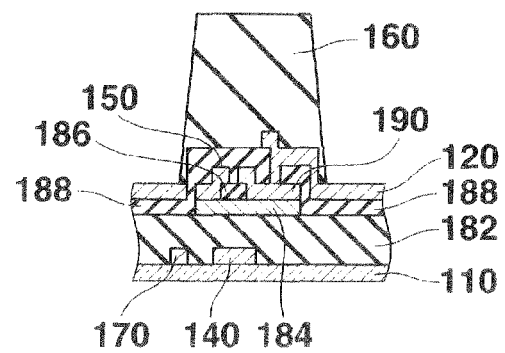
FIG. 6 is a sectional view showing details of an example of the structure of the electrophoretic display device according to the first embodiment of the present invention.

An example of the structure on the pixel-side substrate 110 will be described in more detail with reference to FIGS. 4 to 11 which illustrate the structure of one pixel. FIGS. 4 to 11 partially omit the structure, for the sake of simplicity. FIG. 4 is a planar view showing one pixel of the electrophoretic display device according to the embodiment. FIG. 5 is a sectional view along line V-V in FIG. 4. FIG. 6 is a sectional view along line VI-VI in FIG. 4. As shown in FIGS. 4 to 6, the electrophoretic display device has a layered structure. This structure will be described with reference to FIGS. 7 to 11 starting from the lowermost layer. Note that each of FIGS. 7 to 11 highlights a portion of interest in the planar view of FIG. 4 by hatching.

Figure 7:
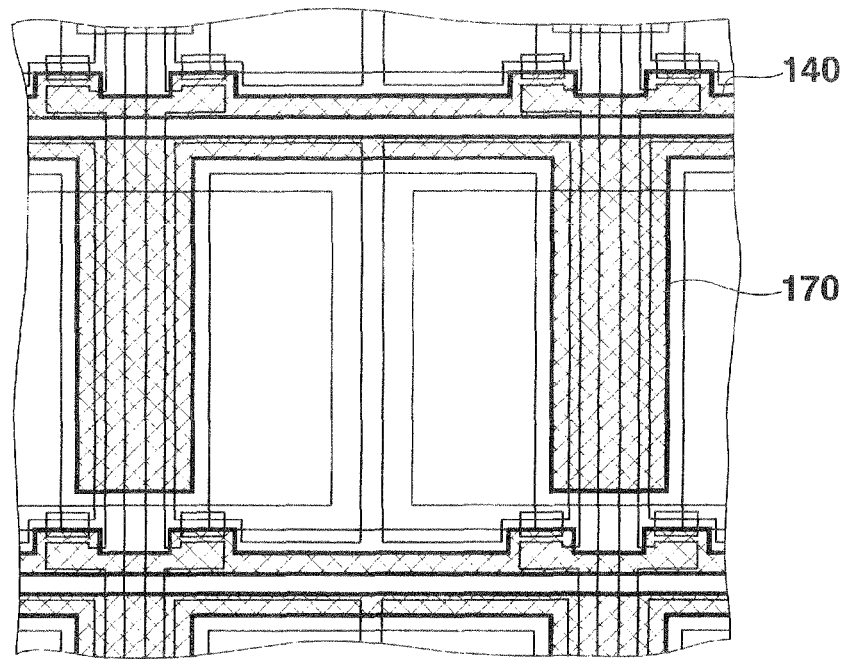
FIG. 7 is a planar view showing hatched scanning lines and compensatory capacity lines in the planar view showing details of an example of the structure of the electrophoretic display device according to the first embodiment of the present invention.

As shown in FIG. 7, compensatory capacity lines 170 and the scanning lines 140 which also serve as the gate electrodes of the TFTs 130 are formed on the pixel-side substrate 110 made of, for example, a glass substrate.

Figure 8:
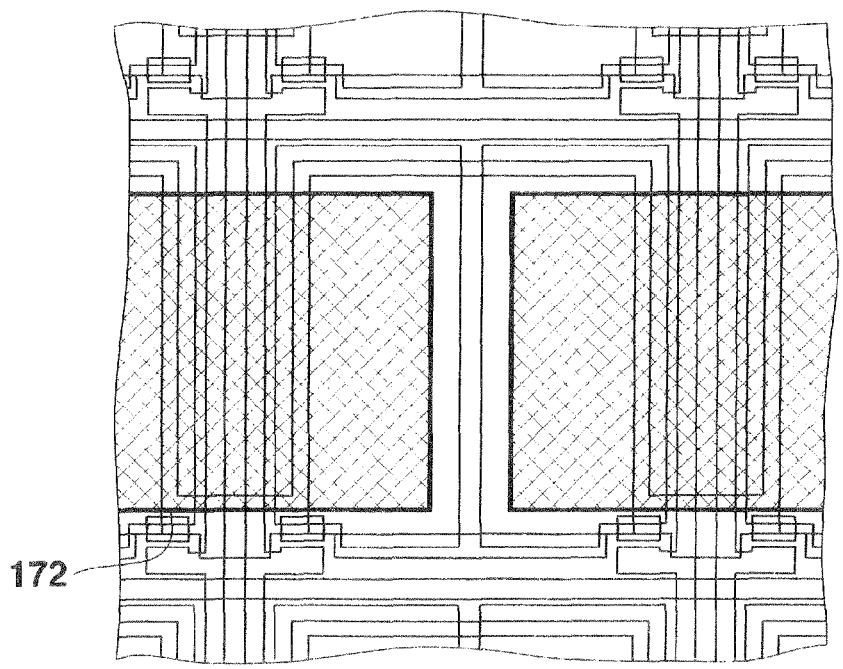
FIG. 8 is a planar view showing hatched compensatory capacity electrodes in the planar view showing details of an example of the structure of the electrophoretic display device according to the first embodiment of the present invention.

As shown in FIG. 8, compensatory capacity electrodes 172 are formed on the compensatory capacity lines 170 at positions under the pixel electrodes 120. The compensatory capacity electrodes 172 may be made of, for example, ITO. An insulation layer 182 is formed on these structures. Channel layers 184 made of, for example, undoped amorphous silicon and serving as the channels of the transistors are formed at portions corresponding to the TFTs 130 and the signal lines 150 on the insulation layer 182. A channel protection layer 186 is formed at the channel portion of each TFT 130.

Figure 9:
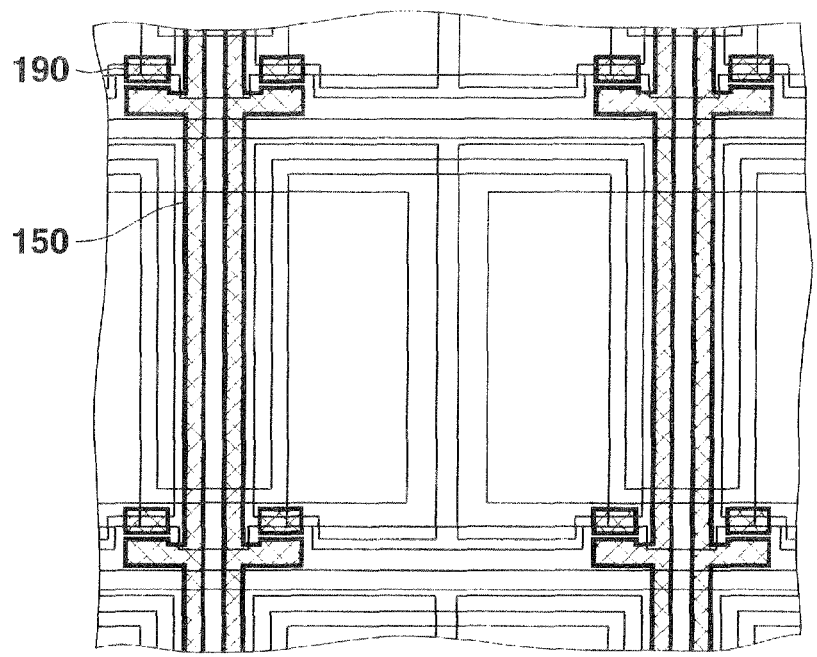
FIG. 9 is a planar view showing hatched signal lines and source electrodes in the planar view showing details of an example of the structure of the electrophoretic display device according to the first embodiment of the present invention.

As shown in FIG. 9, for example, n$^+$ amorphous silicon (not shown) serving as the source electrodes and the drain electrodes of the TFTs 130, the signal lines 150 also serving as the drain electrodes, and source electrodes 190 are formed on these structures. An insulation layer 188 is formed on the signal lines 150 and the source electrodes 190. The insulation layer 188 insulates the signal lines 150 from the source electrodes 190.

Figure 10:
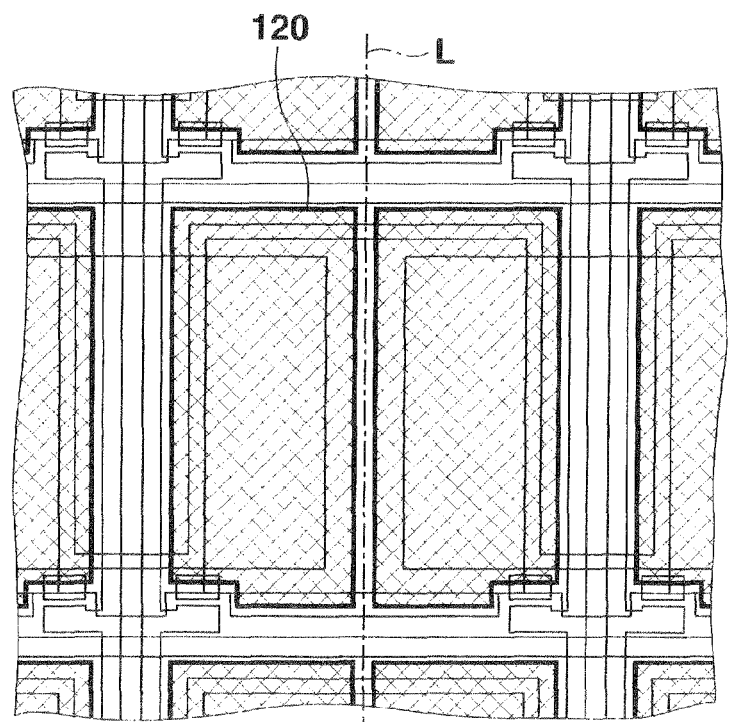
FIG. 10 is a planar view showing hatched pixel electrodes in the planar view showing details of an example of the structure of the electrophoretic display device according to the first embodiment of the present invention.

As shown in FIG. 10, the pixel electrodes 120 made of, for example, ITO are formed on the insulation layer 188. The pixel electrodes 120 are connected to the source electrodes 190. In this embodiment, each pixel electrode 120 has a rectangular shape with one corner cut away, and two pixel electrodes are arranged per pixel to be line-symmetrical, as shown in FIG. 10. The adjacent and opposite sides of the two pixel electrodes 120 in one pixel are parallel and line-symmetrical with respect to line L which is parallel to the signal lines 150 and partitions one pixel compartment into two parts.

Figure 11:
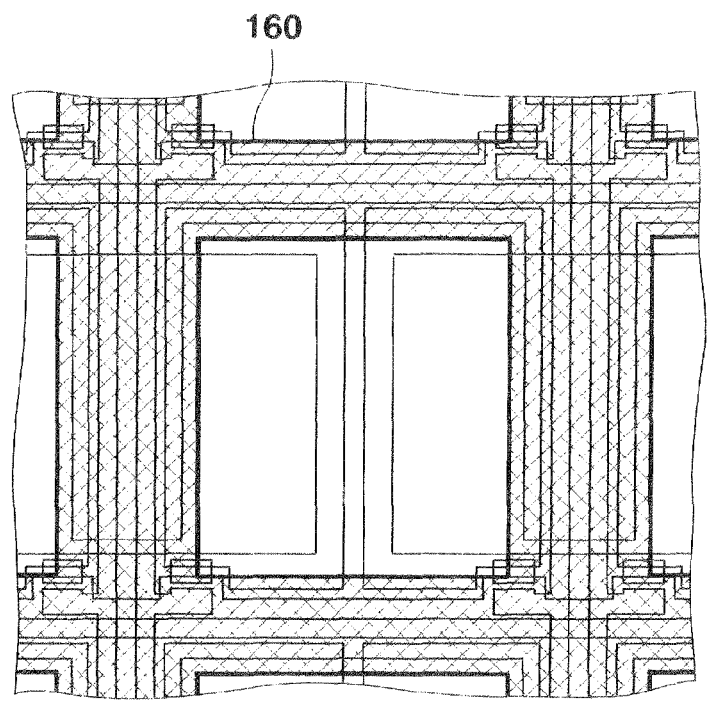
FIG. 11 is a planar view showing hatched microribs in the planar view showing details of an example of the structure of the electrophoretic display device according to the first embodiment of the present invention.

As shown in FIG. 11, the microribs 160 are formed on parts of the pixel electrodes 120 and the insulation layer 188 that covers the TFTs 130 and the signal lines 150. The above-described manufacturing process may use known techniques such as sputtering, mask exposure, and dry and wet etching.

In the above description, the signal lines 150 also serve as the drain electrodes of the TFTs 130, and the source electrodes 190 are connected to the pixel electrodes 120. Reversely, the signal lines 150 may also serve as the source electrodes of the TFTs 130, and the drain electrodes may be connected to the pixel electrodes 120.

As described above, for example, the pixel-side substrate 110 may function as a first substrate. For example, the pixel electrode 120 may function as a first electrode. For example, the thin-film transistor (TFT) 130 may function as a switching thin film transistor. For example, the scanning line 140 may function as a scanning line. For example, the signal line 150 may function as a signal line. For example, the microribs 160 may function as a partition wall. For example, the transparent substrate 210 may function as a second substrate. For example, the common electrode 220 may function as a second electrode. For example, the compensatory capacity line 170 may function as a capacity line. For example, the dispersant 310 may function as a dispersant. For example, the positively-charged black portal ales 320 may function as positively-charged particles. For example, the negatively-charged red particles 330 may function as negatively-charged particles. For example, the neutral white particles 340 may function as weakly-charged particles.

The operation of the electrophoretic display panel according to the embodiment will be described below. Under the control of the controller 460, the scanning driver 420 shown in FIG. 1 sequentially supplies scanning signals to the scanning lines 140 (G(j)) of the display panel 100. When the scanning signals are supplied to the scanning lines 140, the TFTs 130 connected to the scanning lines 140 are turned on. At this time, the signal driver 440 supplies data signals to the signal lines 150 (S(i)) under the control of the controller 460. The data signals supplied to the signal lines 150 (S(i)) are supplied, to the corresponding pixel electrodes 120 via the TFTs 130 turned on by the scanning signals. In this way, the scanning signals are sequentially supplied to the scanning lines 140, and simultaneously, the data signals are supplied to the signal lines 150 to which pixel voltages should be applied. This makes it possible to apply the pixel voltages to desired pixel electrodes 120 of all the pixel electrodes. On the other hand, the common electrode 220 is maintained at a predetermined voltage. The compensatory capacity electrodes 172 located under the pixel electrodes 120 are also maintained at an equi-voltage to the common electrode 220. Hence, the pixel electrodes 120 and the compensatory capacity electrodes 172 form storage capacitors. The storage capacitors contribute to retain the pixel voltages applied by the data signals supplied to the pixel electrodes 120.

Figure 12:
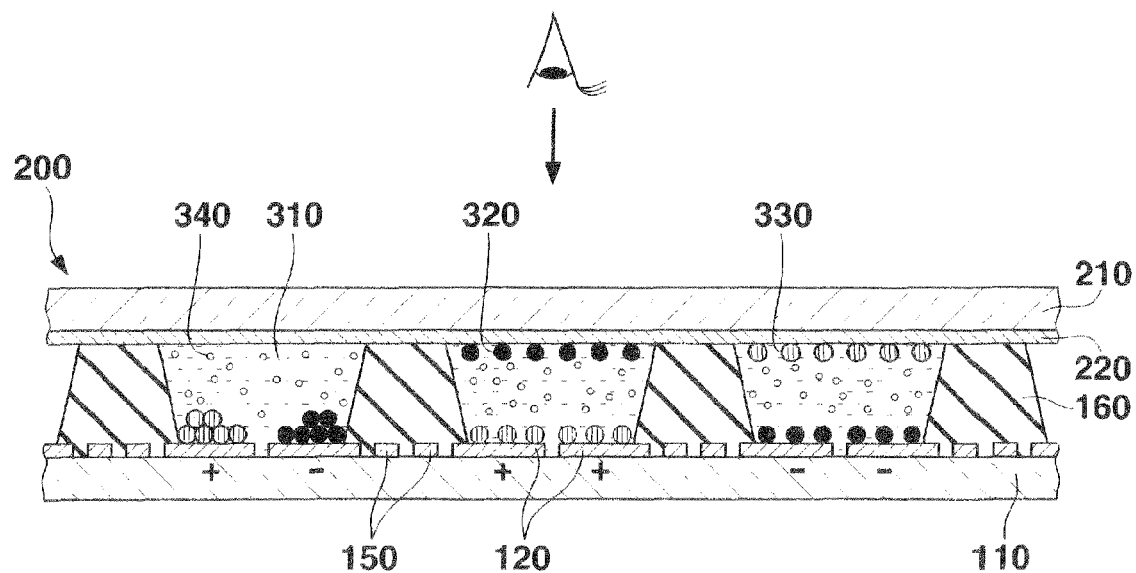
FIG. 12 is a sectional view for explaining the display principle of the electrophoretic display device according to each embodiment of the present invention.

FIG. 12 shows the display principle of the electrophoretic display device according to the embodiment. In the electrophoretic display device according to this embodiment, each pixel has two pixel electrodes 120. The pixel electrodes 120 are independently driven via the TFTs 130, as described above. As shown in FIG. 12, when pixel voltages are applied to the pixel electrodes 120, electric fields are generated between the pixel electrodes 120 and the common electrode 220 facing the pixel electrodes 120. In accordance with the generated electric fields, the positively-charged black particles 320 move to each electrode having negative charges, and the negatively-charged red particles 330 move to each electrode having positive charges in the dispersant 310. The neutral white particles 340 do not move and therefore remain in suspension in the dispersant 310. As a result, when a user observes the electrophoretic display panel from the side of the transparent COM substrate 200 in the direction of the hollow arrow in FIG. 12, the pixels look as follows. A pixel in which the positively-charged black particles 320 gather on the common electrode 220, i.e., a pixel in which a positive pixel voltage is applied to both the two pixel electrodes 120 looks black (middle pixel in FIG. 12). A pixel in which the negatively-charged red particles 330 gather on the common electrode 220, i.e., a pixel in which a negative pixel voltage is applied to both the two pixel electrodes 120 looks red (right pixel in FIG. 12). A pixel in which neither the positively-charged black particles 320 nor the negatively-charged red particles 330 gather on the common electrode 220, i.e., a pixel in which pixel voltages of different polarities are applied to the two pixel electrodes 120, respectively, looks white because of the neutral white particles 340 suspended in the dispersant 310 (left pixel in FIG. 12). That is, each pixel of the display panel 100 can display black, red, or white. In the electrophoretic display panel of the embodiment, the pixels for displaying black, red, or white are arranged in a matrix. Hence, the display panel 100 can display a desired image including three colors by combining the black, red, and white displayed by the pixels.

In this embodiment, an example has been described in which the positively-charged black particles, negatively-charged red particles, and uncharged white particles are sealed in each pixel compartment. However, the colors and charge states of the particles contained in each pixel compartment can arbitrarily be combined. The particles may also have other colors. When a plurality of kinds of color combinations are used for the particles contained for each pixel of one electrophoretic display panel, the electrophoretic display panel can display an image including multiple colors. For example, an electrophoretic display panel in which pixels capable of displaying black, white, and red, pixels capable of displaying black, white, and green, and pixels capable of displaying black, white, and blue are arrayed on one scanning line can display an image of arbitrary colors without degrading the quality of black display and white display.

In the description of the embodiment, the white particles are neutral particles. However, the white particles may be weakly-charged particles having positive or negative charges whose absolute value is much smaller than those of the black particles and the red particles. This allows even the white particles to migrate by controlling the charges of the pixel electrodes 120. It is consequently possible to display an image of higher quality.

The pixel-side substrate of this embodiment may be a non-transparent substrate such as a glass substrate, metal substrate, plastic substrate, or film substrate. The TFT may be a low-temperature p-SiTFT, μc-SiTFT, oxide (e.g., ZnO or InGaZnO) TFT, or organic TFT. The pixel electrode 120 has been described as, for example, an ITO layer. However, since the electrophoretic display panel is a reflective display panel, unlike a liquid crystal display panel, the pixel electrodes 120 need not always be transparent. Hence, the pixel electrodes 120 may be opaque electrodes.

To realize the memory property, i.e., maintaining display without consuming power after an image has been displayed on the display device, which is one of the characteristics of the electrophoretic display device, the leakage current of the TFTs 130 needs to be as small as possible. To do this, the electrophoretic display panel may include a dual-gate structure which connects two TFTs serving as switching elements in series to increase the resistance value.

In this embodiment, the electrophoretic display panel has a structure in which a plurality of electrophoretic display devices for displaying three colors in one pixel are arrayed in a matrix. The plurality of the electrophoretic display devices arrayed in a matrix are driven by an active matrix driving method. As a result, the pixel electrodes 120 can be driven independently, and the pixels arrayed in a matrix can display the three colors. Hence, the electrophoretic display panel can display an image of three colors at a resolution corresponding to the pixel size in the display area of the display panel 100. The electrophoretic display panel can also display a multi-color image using the same arrangement by changing the combinations of the colors of particles to be contained in each pixel compartment.

According to this embodiment, the pixel electrode 120 has a simple shape. For this reason, the pixel electrode can easily be manufactured in a large area. When observing the electrophoretic display panel from the side of the COM substrate 200 in the direction of the hollow arrow, as shown in FIG. 12, constituent elements visible to the observer are the pixel electrodes 120 and the upper surfaces of the microribs 160. Hence, it is possible to increase apertures that expose the upper surface of the pixel electrode 120 by disposing the elements in the following way. The adjacent and opposite sides of the two pixel electrodes 120 are located at a possible minimum interval in parallel to the signal lines 150. No constituent elements are arranged between the adjacent and opposite sides of the two pixel, electrodes 120. That elements other than the pixel electrodes 120 are arranged under the microribs 160. Placing a focus on each pixel, all constituent elements such as the TFTs 130, the scanning lines 140, the signal lines 150, and the compensatory capacity lines 170 other than the pixel electrodes 120 are arranged to be line-symmetrical with respect to the line which is parallel to the signal lines 150 and partitions each pixel compartment into two parts. The microribs 160 are formed in a possible minimum width on these arranged components. The design described above allows an aperture ratio to be increased. As a result, the higher aperture ratio advantageously acts on migration of the charged particles, and contributes to high-quality image display of the electrophoretic display panel according to this embodiment. When the charges of the positively-charged black particles 320 equal to those of the negatively-charged red particles 330, equalizing the areas of the two pixel electrodes 120 can easily control the particles.

Second Embodiment

The second embodiment of the present invention will be described low with reference to the accompanying figures. Only the differences from the first embodiment will be described here. In the first embodiment, the pixel electrode 120 has a rectangular shape with one corner cut away, and two pixel electrodes are arranged per pixel to be line-symmetrical, as shown in FIG. 10. In the first embodiment, when one pixel electrode 120 in one pixel is set at a positive voltage, and the other pixel electrode 120 is set at a negative voltage for white display, the positively-charged black particles 320 and the negatively-charged red particles 330 gather on the negative electrode and the positive electrode, respectively. When the shield of the neutral white particles 340 is sufficient, the observer cannot view the state in which the positively-charged black particles 320 and the negatively-charged red particles 330 gather on the corresponding electrodes and are thus separated into two. Consequently, the pixel looks white to the observer. However, when the shield of the neutral white particles 340 is insufficient, the observer can faintly view the state in which the positively-charged black particles 320 and the negatively-charged red particles 330 are separated into two. Hence, when the shield of the neutral white particles 340 is insufficient, the two separated colors look periodically arranged in a portion where white display pixels are arrayed. Such separation of the positively-charged black particles 320 and the negatively-charged red particles 330 may generate noise that deteriorates the display quality of the electrophoretic display panel. To prevent this, in the second embodiment, a pixel electrode 120 is formed into a comb shape.

Figure 13:
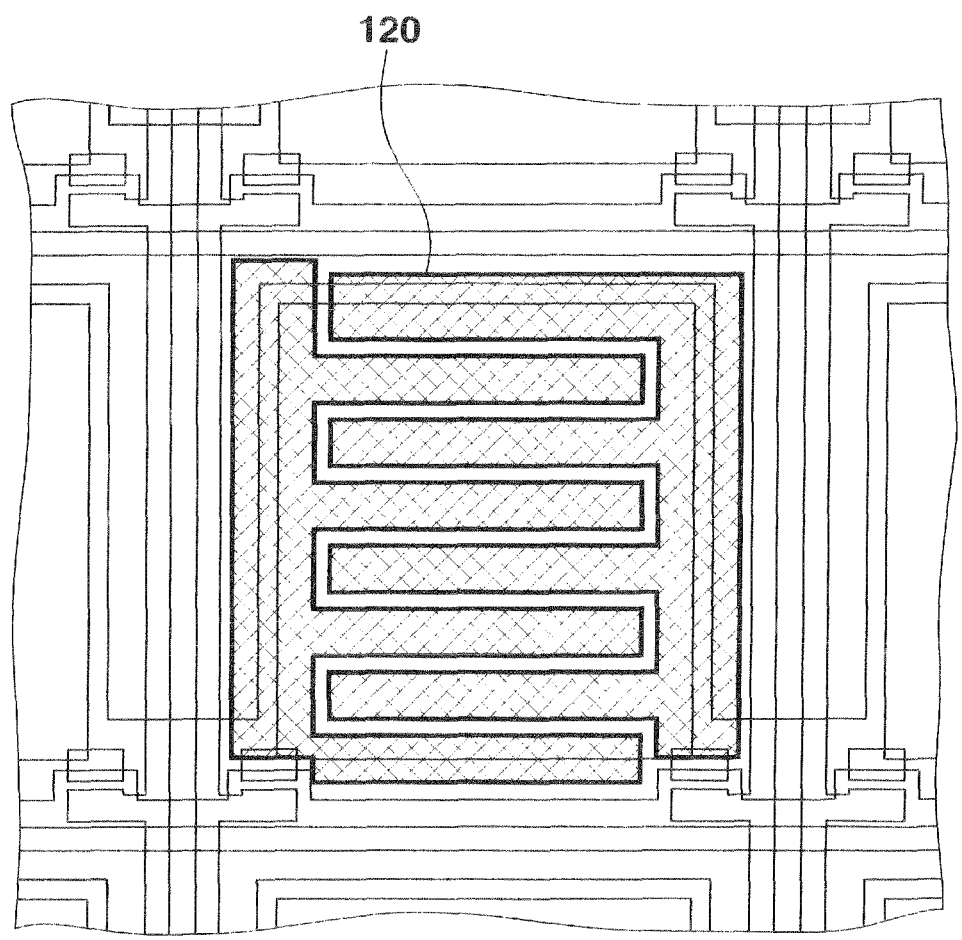
FIG. 13 is a planar view showing details of an example of the structure of an electrophoretic display device according to the second embodiment of the present invention.

FIG. 13 shows an example of the shape of the pixel electrodes 120 according to the embodiment. FIG. 13 corresponds to FIG. 10, and illustrates only the pixel electrodes 120 of the pixel at the center of the drawing for the sake of simplicity. As shown in FIG. 13, each of the two pixel electrodes 120 in one pixel according to this embodiment has a comb shape, and is arranged to mesh with the counterpart. More specifically, the adjacent and opposite sides of the two pixel electrodes 120 in one pixel have a comb shape, and the pixel electrodes 120 are located to mesh with each other with a predetermined interval.

Note that in the embodiment as well, the colors and charge states of particles can arbitrarily be combined, as in the first embodiment. In addition, the materials of the substrates and the pixel electrodes, the type of TFT, and the like are not particularly limited.

According to this embodiment, the area of the pixel electrode 120 is smaller than that in the first embodiment. However, since the two pixel electrodes 120 are arranged in the comb-shaped pattern, positively-charged black particles 320 and negatively-charged red particles 330 are mixed in one pixel for white display. This reduces unsmoothness of an image caused when the shield of neutral white particles 340 is insufficient, and the positively-charged black particles 320 and the negatively-charged red particles 330 look separated in a portion where white display pixels are arrayed, as described above. Consequently, the electrophoretic display panel can display a fine image. As described above, the shape of the pixel electrodes 120 of the electrophoretic display panel according to this embodiment contributes to improve the visibility and display a high-quality image, as compared to the electrophoretic display panel according to the first embodiment.

Third Embodiment

The third embodiment of the present invention will be described below with reference to the accompanying figures. Only the differences from the first embodiment and the second embodiment will be described here as well. In the first embodiment and the second embodiment, the adjacent and opposite sides of the two pixel electrodes 120 in one pixel are linear. The scanning lines, signal line, and capacity lines are linear, too. For this reason, when the shield of the neutral white particles 340 is insufficient, the adjacent and opposite sides of the two pixel electrodes 120 in one pixel may interfere with the scanning lines, the signal line, and the capacity lines. As a result, interference fringes will be generated. The interference fringes may generate noise that deteriorates the display quality of the electrophoretic display panel. To prevent this, in the third embodiment, the adjacent and opposite sides of two pixel electrodes 120 in one pixel are curved.

Figure 14:
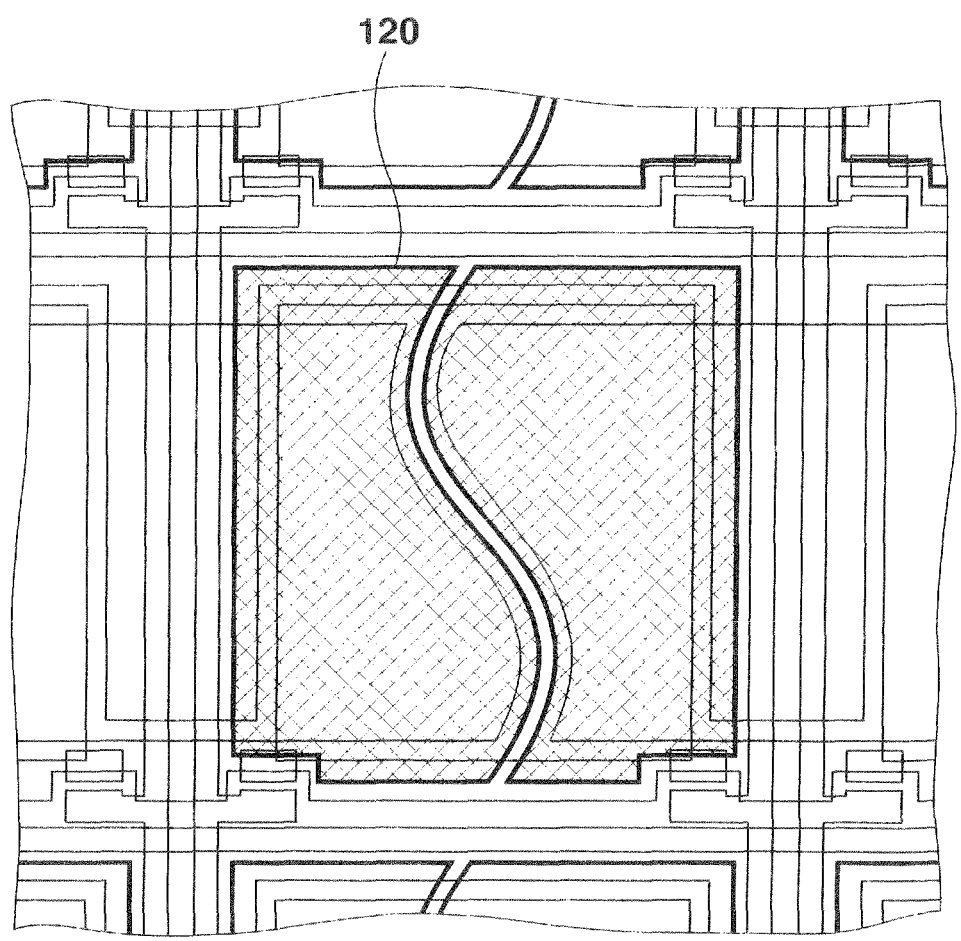
FIG. 14 is a planar view showing details of an example of the structure of an electrophoretic display device according to the third embodiment of the present invention.

FIG. 14 shows an example of the shape of the pixel electrodes 120 according to the embodiment. FIG. 14 corresponds to FIG. 10, and illustrates only the pixel electrodes 120 of the pixel at the center of the drawing for the sake of simplicity. As shown in FIG. 14, the adjacent and opposite sides of the two pixel electrodes 120 in one pixel according to this embodiment are curved in an S-shape.

Note that in this embodiment as well, the colors and charge states of particles can arbitrarily be combined, as in the first embodiment. In addition, the materials of the substrates and the pixel electrodes, the type of TFT, and the like are not particularly limited.

According to this embodiment, the area of the pixel electrode 120 is smaller than that in the first embodiment. However, even if the shield of neutral white particles 340 is insufficient, it is possible to reduce interference fringes between the adjacent and opposite sides of the two pixel electrodes 120 in one pixel and the scanning lines, the signal line, and the capacity lines. As described above, the shape of the pixel electrodes 120 of the electrophoretic display panel according to this embodiment contributes to improve the visibility and display a high-quality image, as compared to the electrophoretic display panels according to the first embodiment and the second embodiment.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrophoretic display panel comprising:
   a first substrate;
   a second substrate which faces the first substrate with a predetermined interval;
   at least one partition wall configured to form a boundary of a plurality of pixel spaces, the pixel spaces being surrounded by the partition wall, the first substrate, and the second substrate;
   a plurality of first electrodes formed on the first substrate, each of the pixel spaces including two first electrodes;
   at least one second electrode formed on the second substrate, the second electrode facing the first electrodes;
   a dispersant contained in each of the pixel spaces;
   positively-charged particles suspended in the dispersant and contained in each of the pixel spaces;
   negatively-charged particles suspended in the dispersant and contained in each of the pixel spaces;
   weakly-charged particles suspended in the dispersant and contained in each of the pixel spaces, the weakly-charged particles having charges whose absolute value is smaller than absolute values of charges of the positively-charged particles and the negatively-charged particles;
   a plurality of switching thin film transistors each including a source electrode, a drain electrode, and a gate electrode;
   scanning lines configured to supply, to the gate electrodes of the switching thin film transistors, scanning signals for selectively turning the switching thin film transistors to ON states; and
   signal lines each connected to one of the source electrode and the drain electrode of each of the corresponding switching thin film transistors, the other of the source electrode and the drain electrode being connected to a corresponding one of the first electrodes, and configured to input a data signal to the switching thin film transistors in the ON state so as to cause the positively-charged particles, the negatively-charged particles, and the weakly-charged particles to migrate;
   wherein adjacent and opposite sides of the two first electrodes included in each of the pixel spaces are curved in an S-shape and are parallel to each other with a predetermined interval therebetween.

2. The panel according to claim 1, further comprising capacity lines,
   wherein the switching thin film transistors, the scanning lines, the signal lines, and the capacity lines are partially located at positions sandwiched between the first substrate and one end of the partition wall.

3. The panel according to claim 2, wherein the partition wall, the switching thin film transistors, the scanning lines, the signal lines, and the capacity lines are arranged to be symmetric with respect to each of the pixel spaces.

4. The panel according to claim 1, wherein the two first electrodes included in each of the pixel spaces have equal areas.

5. An electrophoretic display panel comprising:
- a first substrate;
- a second substrate which faces the first substrate with a predetermined interval;
- at least one partition wall configured to form a boundary of a plurality of pixel spaces, the pixel spaces being surrounded by the partition wall, the first substrate, and the second substrate;
- a plurality of first electrodes formed on the first substrate, each of the pixel spaces including two first electrodes;
- at least one second electrode formed on the second substrate, the second electrode facing the first electrodes;
- a dispersant contained in each of the pixel spaces;
- positively-charged particles suspended in the dispersant and contained in each of the pixel spaces;
- negatively-charged particles suspended in the dispersant and contained in each of the pixel spaces;
- weakly-charged particles suspended in the dispersant and contained in each of the pixel spaces, the weakly-charged particles having charges whose absolute value is smaller than absolute, values of charges of the positively-charged particles and the negatively-charged particles;
- a plurality of first switching thin film transistors each including a source electrode, a drain electrode, and a gate electrode, each of the source electrodes of the first switching thin film transistors being connected to one of the first electrodes included in each of the pixel spaces;
- a plurality of second switching thin film transistors each including a source electrode, a drain electrode, and a gate electrode, each of the source electrodes of the second switching thin film transistors being connected to the other of the first electrodes included in each of the pixel spaces;
- scanning lines configured to commonly supply, to the gate electrodes of the first switching thin film transistors and the second switching thin film transistors, scanning signals for selectively turning on the first switching thin film transistors and the second switching thin film transistors;
- first signal lines each connected to the drain electrode of each of the corresponding first switching thin film transistors to input a data signal to the first switching thin film transistors so as to cause the positively-charged particles, the negatively-charged particles, and the weakly-charged particles to migrate; and
- second signal lines each connected to the drain electrode of each of the corresponding second switching thin film transistors to input a data signal to the second switching thin film transistors so as to cause the positively-charged particles, the negatively-charged particles, and the weakly-charged particles to migrate;
- wherein adjacent and opposite sides of the two first electrodes included in each of the pixel spaces are curved in an S-shape and are parallel to each other with a predetermined interval therebetween.

6. The panel according to claim 5, further comprising capacity lines,
wherein the first switching thin film transistors, the second switching thin film transistors, the scanning lines, the first signal lines, the second signal lines, and the capacity lines are partially located at positions sandwiched between the first substrate and one end of the partition wall.

7. The panel according to claim 6, wherein the partition wall, the first switching thin film transistors, the second switching thin film transistors, the scanning lines, the first signal lines, the second signal lines, and the capacity lines are arranged to be symmetric with respect to each of the pixel spaces.

8. The panel according to claim 5, wherein the two first electrodes included in each of the pixel spaces have equal areas.

* * * * *